US010326704B2

(12) United States Patent
Khan et al.

(10) Patent No.: US 10,326,704 B2
(45) Date of Patent: Jun. 18, 2019

(54) ENABLING CONTINUOUS CONTENT PLAYBACK

(71) Applicant: Amazon Technologies, Inc., Seattle, WA (US)

(72) Inventors: Arshia Khan, San Francisco, CA (US); Yu Gan, Alameda, CA (US); Zhao Yuan Wang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/921,943

(22) Filed: Mar. 15, 2018

(65) Prior Publication Data
US 2018/0205777 A1    Jul. 19, 2018

Related U.S. Application Data

(63) Continuation of application No. 14/634,163, filed on Feb. 27, 2015, now Pat. No. 9,954,919.

(51) Int. Cl.
G06F 15/173    (2006.01)
H04L 12/835    (2013.01)
H04L 12/859    (2013.01)
G06F 16/957    (2019.01)

(52) U.S. Cl.
CPC .......... H04L 47/30 (2013.01); G06F 16/9574 (2019.01); H04L 47/2475 (2013.01)

(58) Field of Classification Search
CPC ...................................... H04L 65/60
USPC ........................................ 709/232
See application file for complete search history.

(56) References Cited

U.S. PATENT DOCUMENTS

| 6,005,563 | A  | * | 12/1999 | White | G06F 3/0236 348/E5.002 |
| 6,005,564 | A  |   | 12/1999 | Ahmad et al. | |
| 9,460,159 | B1 | * | 10/2016 | Mostowy | G06F 17/3089 |
| 2007/0140306 | A1 | * | 6/2007 | Klein | H04L 1/205 370/516 |
| 2009/0106447 | A1 | * | 4/2009 | Lection | H04L 67/02 709/236 |

(Continued)

OTHER PUBLICATIONS

Mark Rushakoff, Chrome and Firefox throttle setTimeout/setInterval in inactive tabs, https://content.pivotal.io/blog/chrome-and-firefox-throttlesettimeout-setinterval-in-inactive-tabs published on Mar. 1, 2012.

Primary Examiner — Hamza N Algibhah
(74) Attorney, Agent, or Firm — Knobbe Martens Olson & Bear LLP

(57) ABSTRACT

To provide the continuous playback of content, a content server may provide code to a requesting device that causes the requesting device to play streaming content delivered in chunks or other portions without disruption in playback. The requesting device may execute the code by a browser or other application, which may cause the requesting device to determine whether a data buffer is empty or nearly empty and request additional content from a streaming server if the data buffer is empty or nearly empty. The process may be repeated a number of times each second for the duration of the playback of the content in order to enable continuous playback of the content regardless of any throttling of the code execution or content playback attempted to be imposed by a browser or other application.

20 Claims, 4 Drawing Sheets

(56) References Cited

U.S. PATENT DOCUMENTS

| | | | | |
|---|---|---|---|---|
| 2012/0166667 | A1* | 6/2012 | Hall | H04L 65/607 709/231 |
| 2013/0262694 | A1* | 10/2013 | Swaminathan | H04L 65/4084 709/231 |
| 2014/0325343 | A1* | 10/2014 | Rao | G06F 17/243 715/234 |
| 2014/0365794 | A1* | 12/2014 | Decker | G06F 1/3246 713/320 |
| 2015/0121410 | A1* | 4/2015 | Yousaf | H04N 21/44204 725/21 |
| 2016/0105473 | A1* | 4/2016 | Klingbeil | H04L 47/2416 370/260 |
| 2016/0191967 | A1* | 6/2016 | Buddha | H04N 21/44209 725/5 |

* cited by examiner

ENABLING CONTINUOUS CONTENT PLAYBACK

CROSS-REFERENCE TO RELATED APPLICATIONS

This application is a continuation of U.S. patent application Ser. No. 14/634,163, entitled "ENABLING CONTINUOUS CONTENT PLAYBACK" and filed on Feb. 27, 2015, which is hereby incorporated by reference herein in its entirety.

BACKGROUND

A user may request a web page or other content page via a browser operating on the user's computing device in order to stream content. For example, the browser may request content from a server, such as a streaming server. The streaming server may transmit a file to the browser that includes content that can be played by the browser, such as audio and/or video. Before the file has been fully transmitted, the browser may begin playing the content included in the file. Once the content has been played, the file may be discarded by the device operating the browser.

If there is any delay in the transmission of the file such that the speed at which the file is played exceeds the speed at which the file is received, the user may be notified of the delay and playback may be paused. Various factors can contribute to this delay. These factors include, for example, (1) the speed of the wireless or wired connection between the user's device and the Internet, (2) the location of, and load on, the streaming server that provides the content, (3) the size of the requested content, and (4) the processing power of the user's device. When the delay is significant (e.g., several seconds or more), the task of playing content can be frustrating for the user.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
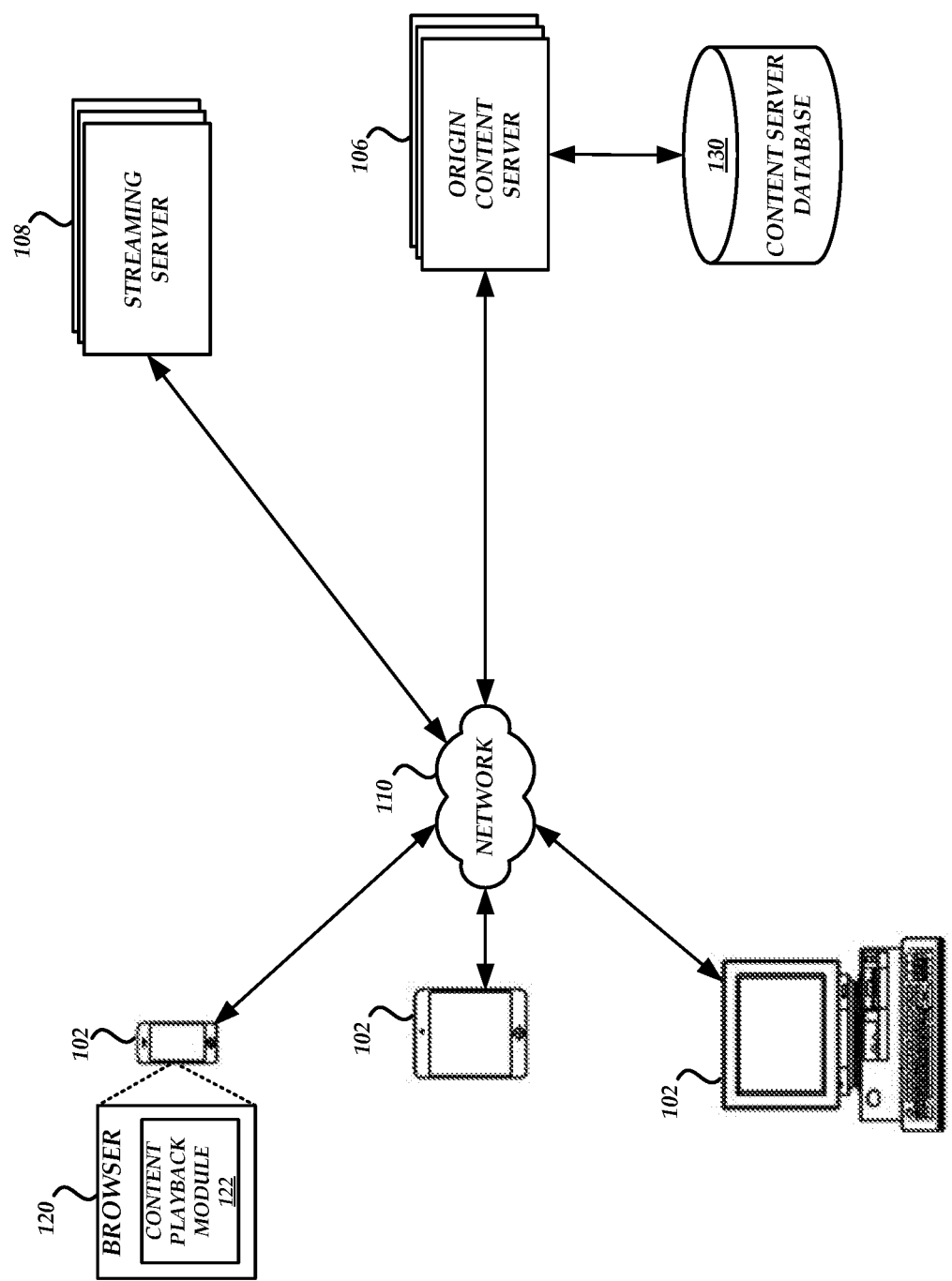
FIG. 1 illustrates a content playback environment that includes an origin content server that provides the code of a page to instruct a browser application to request content from a streaming server and play the requested content, according to one embodiment.

In some cases, the delay in content playback can be attributed to the type and/or version of browser operating on the user's device. For example, the code of a content page may reference a script (e.g., JavaScript, Flash, etc.) that controls the playback of content. The script may request data from a streaming server at select intervals and provide such content to a media player. Scripts, however, can be processor and/or memory intensive. This may be problematic if, for example, a script is running while the user is away from the device, while the user is viewing other content that requires computing resources, while the user is attempting to perform other computing tasks, and/or the like. Thus, to limit the amount of computing resources devoted to a script, certain browsers may throttle the script if the browsing window in which the script is running is inactive (e.g., minimized, not viewable, etc.).

However, when the script that controls content playback is throttled, the user may hear stuttering, pauses, the skipping of content, and/or other disruptions in the continuous playback of the content. In fact, a user may often cause a browsing window playing audio content to become inactive (e.g., by minimizing the browser, switching to a different browser tab, etc.) because the enjoyment of the audio content is not dependent on the visualization of any content, allowing the user to perform other tasks. Thus, it may be desirable to devise a system or method that can skirt the throttling features of the browser when playing streaming content.

Accordingly, aspects of the present disclosure enable the continuous playback of content regardless of the browser state. As used herein, the browser state may refer to whether the browser as a whole and/or the page, window or tab in which the player is running within the browser, is currently active (e.g., displayed as the primary program or page being presented), hidden, minimized, or running in the background. When references are made herein to playback being enabled regardless of browser state, this is intended to mean that the browser must be currently running (e.g., the program must not be closed), but that changes between states of the browser and/or of the specific page do not have an effect on playback of audio content that is noticeable to the listener of the content. The systems disclosed herein may be implemented partly or wholly within a content or origin server. In other embodiments, the systems disclosed herein may be implemented by a content delivery network ("CDN"). The systems and methods disclosed herein may be compatible with existing browser applications without the need for any browser modifications.

According to one embodiment, to provide the continuous playback of content (e.g., audio, video, etc.), a content server (1) retrieves the code (and other content) of a page (e.g., from a local data store), (2) determines a frame rate for the playback of the content, (3) modifies the code of the page to include an instruction to execute a function a number of times that corresponds with the frame rate, and (4) stores the modified code. Upon receiving a request for the page, the content server may retrieve the modified code and transmit it to the requesting device (e.g., a user device). Aspects of the present disclosure may have particular utility in embodiments in which the content being streamed has been broken up into chunks or other discrete portions, rather than being delivered as a single file. One common example of such a content delivery mechanism is HTTP Live Streaming ("HLS"), in which an overall content stream is broken down into a sequence of small file downloads, each download including one short chunk of a larger transport stream. Another example protocol utilizing fragmented content portions is Real Time Messaging Protocol ("RTMP").

For example, the unmodified version of the code of the page may include a script (e.g., JavaScript) that may be interpreted or executed by a browser to control a media player (e.g., a player implemented in Flash or other code that is capable of being executed or interpreted by the browser) that may be embedded in the page. When the unmodified version of the code is executed by a browser operating on the user device, the script may start a timer or any function that executes another function after a set period of time. Upon expiration of the timer (e.g., the timer fired, the set period of time passed, etc.), the script may execute a function that checks a data buffer to determine whether the data buffer is empty or nearly empty (e.g., the amount of data in the data buffer is below a threshold value). If the data buffer is empty or nearly empty, the script may request additional data from a streaming server (e.g., a server that uses the HLS communications protocol) and provide such requested data to the media player for playback. Alternatively, the script may instruct the media player to request the additional data from the streaming server and the media player may receive the requested data directly from the streaming server.

The parameters of the timer may be set such that the timer expires a plurality of times per second (in equal intervals) and for a duration of time that corresponds with a playback time of the content. For example, the parameters may be set such that the timer expires a number of times per second that corresponds with a desired frame rate of the content (e.g., if the frame rate is 20 frames per second, then the timer may expire 20 times a second). Thus, while the browser window in which the script is running is in an active state, the media player may provide continuous playback of the content.

However, many browsers throttle a script by limiting a number of times that a timer can fire (e.g., trigger an action) within a browser throttle period (e.g., a one second interval), regardless of the provided parameters. For example, a timer may normally trigger an action or event when a timer count reaches zero. If the provided parameters indicate that the timer repeats, then the timer count may be reset to a value set by the provided parameters and another action or event may be triggered when the timer count again reaches zero. When a browser throttles a script, after the timer count reaches zero for the first time during the browser throttle period and an action or event is triggered, the browser may prevent the timer from triggering an additional action or event during the same browser throttle period even if the timer count reaches zero again. Thus, the script may identify the timer as firing once per second even though the parameters indicate that the timer should fire twenty times per second. Accordingly, for every browser throttle period, the media player may only receive a fraction of the data the media player would normally receive from the streaming server (thereby causing stuttering or other disruptions in the continuous playback of the content).

Accordingly, the modified version of the code may include a modified script that controls the media player. When the modified version of the code is executed by a browser running on the user device, the script may start a plurality of timers or functions that each execute another function after a set period of time. The parameters of the timers may be set such that the timers expire in a staggered fashion rather than at the same time (e.g., each timer may expire 50 ms after the last timer). Furthermore, the number of timers may correspond with the desired frame rate of the content (e.g., if the frame rate is 20 frames per second, then 20 timers may be started). Upon expiration of any timer, the script may execute a function that checks a data buffer to determine whether the data buffer is empty or nearly empty.

Thus, while the browser may throttle the script (such that the number of times a timer can fire is limited), the modified script may start an increased number of timers in a staggered fashion to compensate for the number of times and the times at which a timer would have fired if not for the browser throttling.

While the disclosure provided below is directed to the retrieval and playback of audio content, this is not meant to be limiting. The techniques described herein can be applied to the retrieval and playback of any content or media in any format. For example, the techniques described herein can be applied to the retrieval and playback of video content, audiovisual content, and/or any other content for which continuous and/or consistent delivery or presentation is desired.

System Components

FIG. 1 illustrates a content playback environment that includes an origin content server 106 that provides the code of a page to instruct a browser application 120 (operating on a user device 102) to request content from a streaming server 108 and play the requested content, according to one embodiment. The origin content server 106 may modify the code of a page before the code is requested by the browser application 120, such that continuous playback of the content becomes possible regardless of the state of the browser application 120.

The content playback environment shown in FIG. 1 includes various user devices 102 and various origin content servers 106. As will be appreciated by those of skill in the relevant art, the content playback environment may include any number of distinct user devices 102 and/or origin content servers 106. In other embodiments not shown, the content playback environment may also include other content sources, such as a content delivery network ("CDN") server. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute the browser application 120 to communicate via the network 110 with other computing systems, such as the origin content servers 106, in order to request and display content. Aspects of the present disclosure enable continuous content playback on a wide variety of browsers, such that the presence of a specific type or version of browser application on a given user device 102 is generally not a limitation of the systems and methods described herein, provided that the browser is capable of processing and/or executing the type of code, scripts, and content utilized in a given embodiment.

Illustratively, a user may use the browser application 120 to request network-accessible content (e.g., content pages, images, video, etc.) hosted or provided by a content source, such as an origin content server 106 or a CDN server. In response to a request, the browser application 120 may receive code that, when executed, causes the browser application 120 to retrieve content from various sources. The browser application 120 may be configured to manage the playback of content using, for example, a content playback module 122. The content playback module 122 may include a media player and be a component of the browser application 120 or a browser add-in or extension. The browser application 120 may be further configured to execute the code received from the origin content server 106 or the CDN server. Upon execution of the code, the browser application 120 may start a script that causes the browser application 120 to request data (e.g., audio data, video data, etc.) from the streaming server 108 such that the content playback module 122 can play the content as the data is received.

The origin content servers 106 and CDN servers (not shown) can correspond to logical associations of one or more computing devices for hosting content and servicing requests for the hosted content over the network 110. For example, a content server 106 or CDN server can include a web server component corresponding to one or more server computing devices for obtaining and processing requests for content (such as content pages) from user devices 102 or other devices or service providers. In some embodiments, one or more content servers 106 may be associated with one or more CDN service providers (e.g., entities that manage multiple CDN servers), application service providers, etc.

An origin content server 106 may include or communicate with various modules, components, data stores, and the like to provide the content playback functionality described herein. For example, the origin content server 106 may communicate with a content server database 130 that stores content pages and/or modified content pages. The origin content server 106 may further include a module, such as a code modification module (not shown), that is configured to modify the code of a page to include the plurality of timers or other functions that execute another function after a set period of time described herein.

The streaming server 108 can be a computing system configured to provide content to user devices 102. The content may be audio data, video data, audiovisual data, and/or the like. In some embodiments, the content playback environment includes a plurality of streaming servers 108 that together may provide a single stream of content to a user device 102. Alternatively or in addition, the content playback environment may include a plurality of streaming servers 108 that each store and provide different types or categories of content to the user devices 102. In some embodiments, the streaming server 108 may communicate with other components of the content playback environment (e.g., the user devices 102) using the HLS communications protocol.

The streaming server 108 may be a single computing device, or it may include multiple distinct computing devices, such as computer servers, logically or physically grouped together to collectively operate as a server system. The components of the streaming server 108 can each be implemented in application-specific hardware (e.g., a server computing device with one or more ASICs) such that no software is necessary, or as a combination of hardware and software. In addition, the modules and components of the streaming server 108 can be combined on one server computing device or separated individually or into groups on several server computing devices. In some embodiments, the streaming server 108 may include additional or fewer components than illustrated in FIG. 1.

Example State Diagrams for Continuous Content Playback

Figure 2:
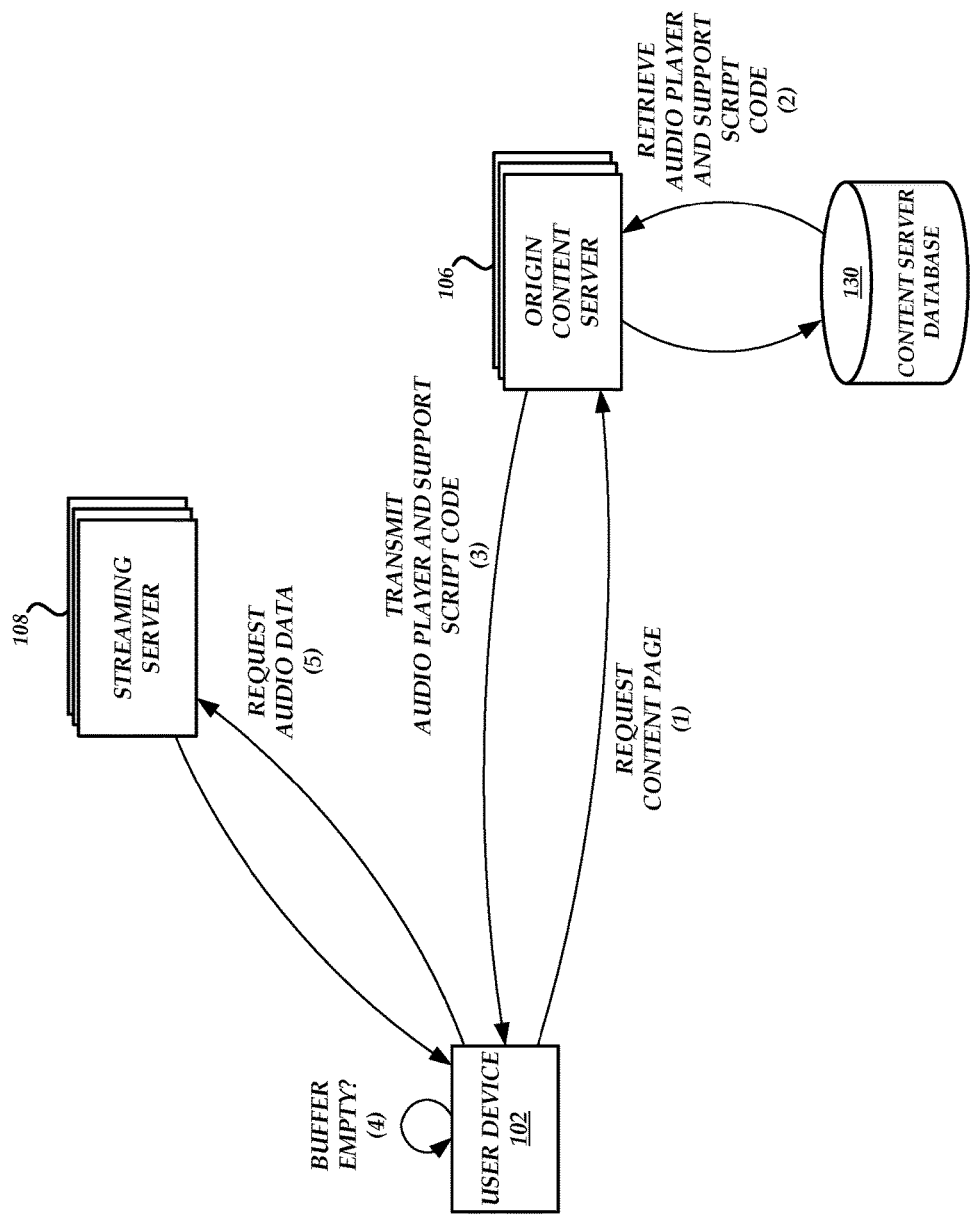
FIG. 2 illustrates a state diagram depicting actions performed by the components in the content playback environment, according to one embodiment.

FIG. 2 illustrates a state diagram depicting actions performed by the components in the content playback environment of FIG. 1, according to one embodiment. As illustrated in FIG. 2, the user device 102 may (1) request a content page from the origin content server 106. For example, the user device 102 may request the content page so that a user of the user device 102 can listen to audio content. The request for a content page may cause the origin content server 106 to (2) retrieve audio player and support script code from the content server database 130 and (3) transmit the audio player and support script code to the user device 102.

In an embodiment, the origin content server 106 modifies the audio player and support script before transmitting the audio player and support script code to the user device 102. For example, the original audio player and support script code may include a reference to a script that starts a single timer (e.g., via the setInterval( ) or setTimeOut( ) JavaScript API call). As described below, the audio player and support script code provided to the user device 102 may include a reference to a script that starts a plurality of timers. The origin content server 106 may modify the original audio player and support script code such that it includes a reference to a script that starts a plurality of timers. In other embodiments, the support script code for various pages may be modified manually or during a batch process prior to the user request being received, such that the origin content server 106 may not modify any code or scripts when responding to user requests.

The audio player and support script code may be a portion of the content page code, where the content page code, when executed, causes the browser application 120 of the user device 102 to render the requested content page. In some embodiments, the content page code is transmitted to the user device 102 to provide the audio player and support script code. In further embodiments, the content page code is dynamically generated by the origin content server 106 before being provided to the user device 102. For example, the content page code may include references to various components or devices that store code (e.g., a server or repository other than origin content server 106). The origin content server 106 may retrieve the referenced code from the various components or devices and assemble and aggregate the retrieved code with the original content page code to create a modified version of the content page code that can then be transmitted to and executed by the user device 102.

In some embodiments, the page includes a reference to a script (e.g., JavaScript) that controls an audio player (e.g., created by a Flash instance). Once executed by the browser application 120, the script may start a plurality of timers or functions that execute another function after a set period of time. The parameters of the timers may be set such that the timers expire in a staggered fashion rather than at the same time (e.g., each timer may expire 50 ms after the last timer). The duration of time before a timer expires may be based on the desired frame rate of the audio content (e.g., if the frame rate is 20 frames per second, then each timer may expire after 50 ms). Furthermore, the number of timers may correspond with the desired frame rate of the audio content (e.g., if the frame rate is 20 frames per second, then 20 timers may be started).

Upon expiration of any timer, the script may (4) execute a function that checks a data buffer to determine whether the data buffer is empty or nearly empty (e.g., the amount of data in the data buffer is below a threshold value). The data buffer may store audio data provided by the streaming server 108 that is processed by the audio player to produce an audio signal that can be output to a speaker or other such device. Thus, if the data buffer is empty or nearly empty, then the audio player may not be able to produce an audio signal, which may result in stuttering or other disruptions in the continuous playback of the audio content.

If the data buffer is empty or nearly empty, the script may (5) request additional audio data from the streaming server 108 and provide such requested data to the audio player for playback. Alternatively, the script may instruct the audio player to (5) request the additional audio data from the streaming server 108 and the audio player may receive the requested data directly from the streaming server 108. If the data buffer is not empty or nearly empty, then the script may not perform any actions and the audio player may continue processing the audio data in the data buffer.

In an embodiment, step (4) is repeated a plurality of times a second for a duration of time that matches or nearly matches a length in time of the audio content. Step (4) may be repeated a number of times a second that corresponds with the desired frame rate of the audio content. The desired frame rate may be specified by the user device 102, the streaming server 108, the origin content server 106, and/or network conditions at the time of streaming.

Figure 3:
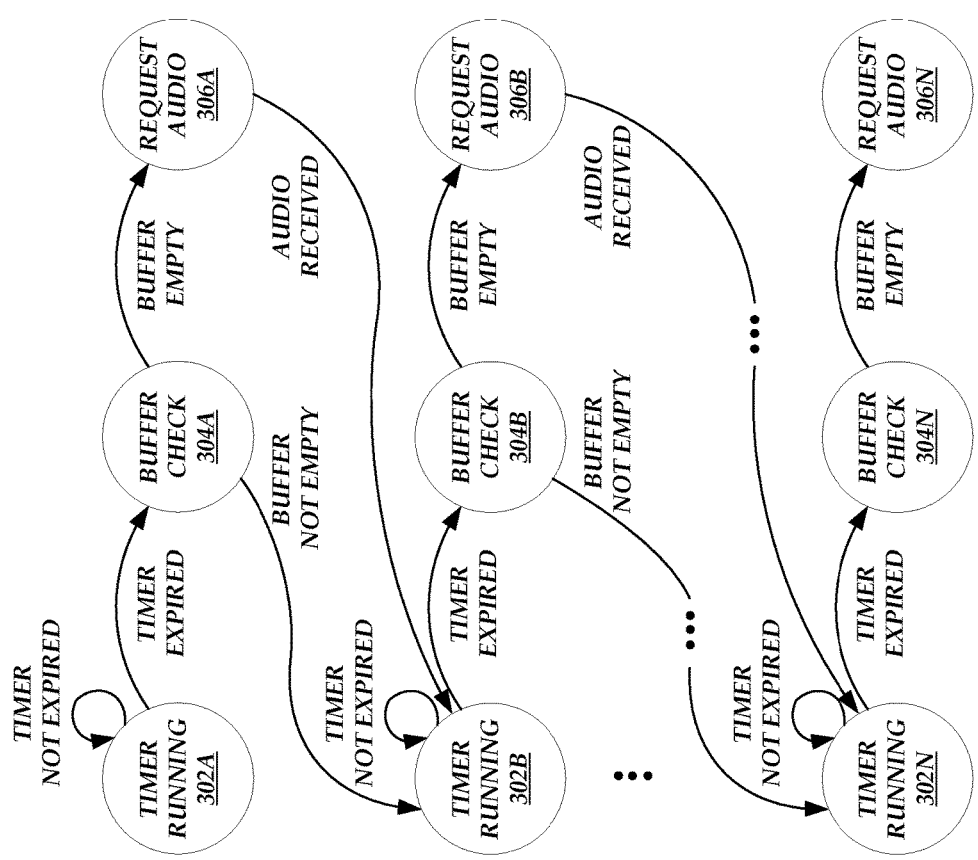
FIG. 3 illustrates a state diagram depicting actions performed by the browser application of the user device in the content playback environment, according to one embodiment.

FIG. 3 illustrates a state diagram depicting actions performed by the browser application 120 of the user device 102 in the content playback environment, according to one embodiment. In an embodiment, the state diagram illustrated in FIG. 3 depicts the actions performed once the user device 102 has received the content page code and has begun executing the script included in the content page code. For example, the state diagram depicts the actions that may be performed as the timers referenced by the script in the content page code begin expiring during a browser throttle period (e.g., a one second period, or other time period selected in a given embodiment based on various considerations, such as network latency, file chunk size, desired audio quality, and/or others).

As described above, the script may include a plurality of timers that fire in a staggered manner. At state 302A, a first timer is running. Alternatively, not shown, at state 302A, a function that executes another function (e.g., a function that checks whether the data buffer is empty) after a set period of time may be executed. The user device 102 (e.g., the executing script) may periodically check to determine whether the first timer has expired and/or wait for a system indication that the timer has expired, depending on the browser type and/or script type used in a given embodiment. If the first timer has not expired, the user device 102 remains at state 302A. If the first timer has expired, the user device 102 transitions to state 304A.

At state 304A, the user device 102 determines whether the data buffer is empty. If the data buffer is empty, the user device 102 transitions to state 306A. Otherwise, the user device 102 transitions to state 302B. Next, at state 306A, the user device 102 requests audio data from the streaming server 108. The script may initiate the request or the audio player controlled by the script may initiate the request at the instruction of the script, depending on the embodiment. Once the audio data is requested and received, the user device transitions to state 302B.

At state 302B, a second timer is running. Alternatively, not shown, at state 302B, a second function that executes another function (e.g., the function that checks whether the data buffer is empty) after a set period of time may be executed. The user device 102 may transition to states 304B, 306B, and so on in a manner as described above with respect to states 302A, 304A, and 306A until reaching states 302N, 304N, and/or 306N. As an example, N may correspond with a number of timers referenced in the script. Thus, a timer N, which runs at state 302N, may be the last timer that runs during the browser throttle period. During the buffer check at state 304N, if the user device 102 determines that the buffer is not empty, the user device 102 may transition back to state 302A (e.g., which corresponds with the beginning of a new browser throttle period). Likewise, once audio data is received at state 306N, the user device 102 may transition back to state 302A. The user device 102 may transition through the state diagram a plurality of times until playback of the audio content is complete.

Example Audio Data Streaming Process

Figure 4:
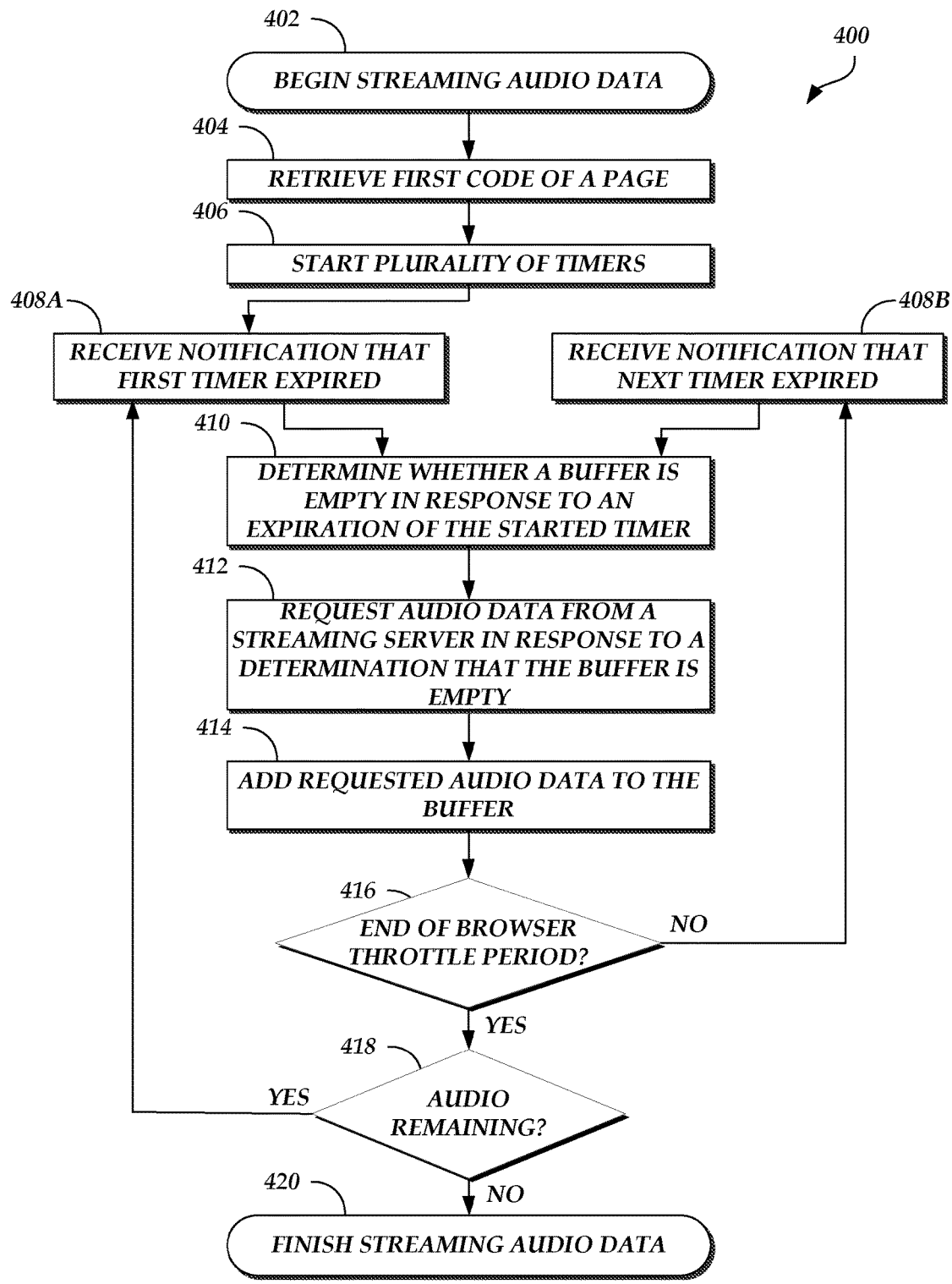
FIG. 4 illustrates an audio data streaming process that may be implemented by a user device to play back audio content, which may be implemented at least in part by interpreting or executing code received from a server, according to one embodiment.

FIG. 4 illustrates an audio data streaming process 400 that may be implemented by a user device to play back audio content based on code received from an origin content server, according to one embodiment. As an example, the user device 102 of FIG. 1 can be configured to execute the audio data streaming process 400 by the browser-implemented content playback module 122 based at least in part on code received from the origin content server 106 in response to a page request by the user device 102. The audio data streaming process 400 begins at block 402.

At block 404, first code of a page is retrieved. The first code of the page may be retrieved in response to a user requesting media content, such as a music file. The first code may include a script that controls or otherwise interacts with a media player that, when selected by the user, plays the media content. After block 404, the audio data streaming process 400 proceeds to block 406.

As described herein, the first code may include a script that, when executed, starts a plurality of timers. At block 406, each timer in the plurality is started. Each timer in the plurality may run continuously such that the respective timer restarts after expiring. Each timer may expire once during a browser throttle period (such as a one second period). After block 406, the audio data streaming process 400 proceeds to block 408A.

Next, at block 408A, a notification that a first timer expired is received. The first timer may expire after a time that corresponds with a frame rate of the media content. For example, if the media content has a frame rate of 20 frames per second, the first timer may expire after 50 ms (e.g., 1000 ms divided by 20). After block 408A, the audio data streaming process 400 proceeds to block 410.

Once a notification is received that a timer expired, the user device determines whether a buffer is empty at block 410. For example, the buffer may be a data buffer that includes data processed by the media player to play back the media content. If the buffer is empty, the media player may produce stuttering or other disruptions in the playback of the media content.

At block 412, audio data from a streaming server is requested in response to a determination that the buffer is empty. For example, upon the request for audio data, the streaming server 108 may provide a packet of data that corresponds with the next portion of the media content being played by the media player. The requested audio data is added to the buffer at block 414. In an embodiment, the media player may begin processing the requested audio data once it is added to the buffer and other data already stored in the buffer has been processed.

The audio data streaming process 400 determines whether the browser throttle period has ended at block 416. For example, the plurality of timers may expire at consistently dispersed times throughout each browser throttle period (e.g., each second), where the number of timers started corresponds with the frame rate of the media content. In an embodiment, the audio data streaming process 400 proceeds to block 408B to receive a notification that the next timer has expired if the browser throttle period has not yet ended (e.g., if additional timers have yet to expire during the browser throttle period), and then repeats blocks 410 through 414 once the notification is received that the next timer expired. The audio data streaming process 400 may proceed to block 418 if the browser throttle period has ended, such as if every timer that will expire in the given second or other throttle period has already expired.

At block 418, the audio data streaming process 400 determines whether playback of the streamed audio is complete or whether additional time (and thus audio data) is remaining. The audio data streaming process 400 may make the determination at the end of the current browser throttle period. In an embodiment, the audio data streaming process 400 proceeds back to block 408A at the start of a new browser throttle period if audio data is remaining, then repeats blocks 408A through 416 for this next throttle period. The audio data streaming process 400 may be complete, as shown in block 420, if no audio data is remaining. Thus, the audio data streaming process 400 may repeatedly step through blocks 408A through 418 until playback of the media content is complete.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a database configured to store code for a plurality of content pages; and
a server configured to:
retrieve first code corresponding to a first content page from the database, wherein the first code, when executed by a browser application running on a user device, directs the user device to execute a set of functions at different times during a time period, wherein execution of each function in the set of functions comprises performing a process comprising:
determining that an amount of data remaining in a buffer is below a threshold value,
retrieving a data block from a streaming server, and storing the retrieved data block in the buffer,
wherein a number of functions in the set of functions that are individually executed during the time period corresponds with a frame rate of content, and wherein performance of the process enables the user device to output the content at the frame rate independent of a state of the browser application, and
transmit the first code to the user device.

2. The system of claim 1, wherein enabling the user device to output the content at the frame rate independent of the state of the browser application comprises causing content playback without audible or visible interruption when the browser application is in a minimized state.

3. The system of claim 1, wherein the first code comprises a script that, when executed by the browser application, directs the user device to execute the set of functions.

4. The system of claim 1, wherein the number of functions in the set of functions equals a number of frames per second processed during playback of the content.

5. The system of claim 4, wherein the first code, when executed by the browser application running on the user device, directs the user device to perform the process a number of times that equals the number of functions in the set of functions that are executed during a one second period of time.

6. The system of claim 1, wherein the state of the browser application is determined based on a state of a window in the browser application that is associated with the content.

7. The system of claim 6, wherein the window in the browser application is in a first state if the window is viewable in the browser application, the window is in a second state if the browser application is active and the window is not viewable in the browser application, and the window is in a third state if the browser application is inactive and the window is not viewable in the browser application.

8. The system of claim 1, wherein the server is further configured to:
retrieve second code referenced by an original first content page code from a second server;
retrieve third code referenced by the original first content page code from a third server; and
assemble the original first content page code, the second code, and the third code to form the first code.

9. A computer-implemented method comprising:
as implemented by one or more computing devices configured with specific executable instructions,
retrieving first code corresponding to a first content page from a database, wherein the first code, when executed by a browser application running on a user device, directs the user device to execute a set of functions at different times during a time period, wherein execution of each function in the set of functions comprises performing a process comprising:
determining that an amount of data remaining in a buffer is below a threshold value,
retrieving a data block from a streaming server, and storing the retrieved data block in the buffer,
wherein a number of functions in the set of functions that are individually executed during the time period corresponds with a frame rate of content, and wherein performance of the process enables the user device to output the content at the frame rate independent of a state of the browser application; and
transmitting the first code to the user device.

10. The computer-implemented method of claim 9, wherein enabling the user device to output the content at the frame rate independent of the state of the browser application comprises causing content playback without audible or visual interruption when the browser application is in a minimized state.

11. The computer-implemented method of claim 9, wherein the retrieved data block comprises at least one of audio data, video data, or audiovisual data.

12. The computer-implemented method of claim 9, wherein the first code comprises a script that, when executed by the browser application, directs the user device to execute the set of functions.

13. The computer-implemented method of claim 9, wherein the number of functions in the set of functions equals a number of frames per second processed during playback of the content.

14. The computer-implemented method of claim 9, wherein the state of the browser application is determined based on a state of a window in the browser application that is associated with the content.

15. The computer-implemented method of claim 14, wherein the window in the browser application is in a first state if the window is viewable in the browser application, the window is in a second state if the browser application is active and the window is not viewable in the browser application, and the window is in a third state if the browser application is inactive and the window is not viewable in the browser application.

16. A non-transitory computer-readable medium having stored thereon executable program code that directs a computing device to perform operations when executed by a browser component operating on the computing device, the operations comprising:

executing a set of functions at different times during a browser throttle period, wherein a number of functions in the set of functions that are individually executed during the browser throttle period corresponds with a frame rate of content, and wherein execution of each function in the set of functions comprises performing a process that comprises:

determining that an amount of data remaining in a buffer is below a threshold value, retrieving a data block, and storing the retrieved data block in the buffer, wherein performance of the operations enables the computing device to output the content at the frame rate during the browser throttle period.

17. The non-transitory computer-readable medium of claim 16, wherein the retrieved data block comprises at least one of audio data, video data, or audiovisual data.

18. The non-transitory computer-readable medium of claim 16, wherein the number of functions in the set of functions equals a number of frames per second processed during output of the content.

19. The non-transitory computer-readable medium of claim 18, wherein the operations further comprise performing the process a number of times that equals the number of functions in the set of functions that are executed during a one second period of time.

20. The non-transitory computer-readable medium of claim 16, wherein the browser component is inactive during the browser throttle period.

* * * * *